3,041,295
POLYURETHANE COMPOSITION CONTAINING A CHLORINATED PHOSPHATE ESTER AND A BASIC LITHIUM COMPOUND AND PROCESS OF MAKING SAME
George H. Wiech, Mountainside, and Raymond A. Dragon, Union, N.J., assignors to Celanese Corporation of America, New York, N.Y., a corporation of Delaware
No Drawing. Filed Jan. 25, 1957, Ser. No. 636,242
5 Claims. (Cl. 260—2.5)

This invention relates to polyurethane compositions containing a chlorinated phosphate ester and a lithium containing compound.

Polyurethanes are high molecular weight compounds containing a plurality of urethane or analogous linkages. One such group of compounds which are coming into large scale commercial use at the present time are the so-called polyurethane foams which are prepared by reacting together a generally linear high molecular weight compound containing a plurality of reactive groups which are generally free hydroxyl groups, such as a polyester; a polyisocyanate, such as a diisocyanate; and water, generally in the presence of a catalyst. When the reaction is carried out under suitable conditions, a portion of the diisocyanate reacts with the hydroxyl groups in the polyester to form a cross-linked polymer, while another portion of the diisocyanate reacts with water, liberating carbon dioxide which converts the polymer to a foam. Depending upon the relative proportions of the ingredients, the method of mixing, and other precise conditions, the foams may range from soft and highly flexible materials to stiff, rigid materials. Related polyurethanes may be prepared under such conditions that no foam is generated and have been found useful as ingredients in coating compositions. The production of these polyurethane polymers is known in the art and does not, in itself, form a part of the present invention. Examples of the production of such polyurethane foams are given in the articles in "Modern Plastics," April 1954, page 143; "Modern Plastics," August 1955, page 102; "British Plastics," January 1956, page 5; and in the patents and other references referred to in these articles.

While the polyurethane foams have many desirable properties, they are flammable which limits their applicability. It has been proposed to reduce the flammability by incorporating into such polyurethanes a chlorinated phosphate ester. While this greatly reduces or even eliminates the flammability of the foam, it has been found that when the phosphate ester-containing product is exposed for an extended period of time to a high humidity at an elevated temperature, there is a strong tendency for the foam to exhibit a considerable degree of break-down as evidenced by its discoloration, loss in strength and flexibility, and even by its crumbling and disintegration. This has heretofor limited the utility of the phosphate ester as an additive to the polyurethane foams.

It is an important object of this invention to provide a composition which will be free from the foregoing and other difficulties.

A further object of this invention is to provide a polyurethane composition containing a chlorinated phosphate ester and a lithium containing compound.

Other objects of this invention will be apparent from the following detailed description and claims.

According to the present invention, it has been found that the tendency of polyurethane foams containing chlorinated phosphate esters to break down on exposure to high humidities at an elevated temperature may be greatly reduced or substantially eliminated by incorporating into such compositions a small proportion of a lithium containing compound. The products obtained in this manner show all the desirable properties of conventional polyurethanes, are non-flammable and retain their properties for extended periods of time even when exposed to high humidities at elevated temperatures.

In putting this invention into practice, the polyurethane foams may be prepared in conventional manner. For example, the polyester containing free hydroxyl groups and the diisocyanate may be mixed together to form a prepolymer to which may be added to the desired proportion of chlorinated phosphate ester. This prepolymer may then be mixed with an aqueous emulsion, containing suitable emulsifying agents, of a catalyst for the polymerization, which emulsion contains the desired proportion of lithium compound. This mixing is best carried out in a foam machine which will control the rate and manner of mixing and which will also shape the foam to give a product of the desired form. Many suitable machines for this purpose are available. Examples of such machines may be found in the articles referred to above.

The proportion of chlorinated phosphate ester which is incorporated into the polyurethane should be at least 3% by weight or preferably between 5 and 10% by weight on the total weight of the product to give a foam having a suitably low degree of flammability. The phosphate ester has been found not only to lower the flammability of the polyurethane foams, but also improves their processing whereby a product having a more uniform cell structure is obtained. The phosphate esters employed have chlorine linked to aliphatic carbon atoms. Examples of such esters are tris-(beta-chlorethyl)-phosphate and similar simple and mixed lower aliphatic esters. The phosphate esters are advantageously incorporated into the prepolymer as described above.

There is also incorporated into the polyurethanes a lithium containing compound, preferably one having a basic reaction. Examples of suitable compounds having a basic reaction for this purpose are lithium ricinoleate, lithium carbonate and lithium hydroxide. The proportion of lithium containing compound should be sufficient to give the final product a lithium content, calculated as lithium metal, of at least 0.025 to 0.03% by weight, or, preferably, between 0.15 and 0.4% by weight. The lithium containing compound is advantageously incorporated into the water which is reacted with the prepolymer. Attempts to incorporate the lithium containing compound into the prepolymer in conventional foaming equipment have not been practical since they caused the polymerization to occur at a faster rate resulting in a viscous material which reacted at such a rapid rate with water that the reaction went too far in the mixing chamber of the foam machine.

The presence of the lithium containing compound substantially prevents the accelerated breakdown of the polyurethane caused by the presence of the chlorine containing phosphate ester when the polyurethane is exposed at high humidities to an elevated temperature. A test for determining the extent of breakdown was been proposed in the Humidity Aging Text (Proposed Tentative Specifications of Methods of Test for Flexible Urethane Foam, The Society of the Plastics Industry, Inc., June 4, 1956), according to which samples are exposed for a period of seven days at temperature of 150° F.±2° F. to a relative humidity of 95 to 100%. Surprisingly enough, many other stabilizers that have been suggested for incorporation into polymeric compositions have not proved effective in preventing the breakdown of polyurethane foams when employed in combination with chlorinated phosphate esters.

The following examples are given to illustrate this invention further:

*Example I*

A prepolymer is prepared by mixing together 750 parts by weight a polyester containing free hydroxyl groups sold by Rohm & Haas as Paraplex U–148 and characterized as follows: number average molecular weight (ebulliometric) 1800–2000; equivalent weight 745–830; hydroxyl number (calculated) 65–75; acid number 3 (maximum), and viscosity at 25° C. 8,000–10,000 centipoises, Brookfield spindle No. 4, 30 r.m.p., together with 292 parts by weight of tolylene diisocyanate. To each 100 parts by weight of this prepolymer there is added 5 parts by weight of tris-(beta-chlorethyl)-phosphate. An emulsion is prepared by mixing together 38 parts by weight of water, 1 part by weight of Tween-20 which is a polyoxyethylene sorbitan monolaurate sold by the Atlas Powder Company, 1 part by weight of Brij–35 which is a polyoxyethylene lauryl ether sold by the Atlas Powder Company, 15 parts by weight of Emcol H–77, and emulsifier comprising a balanced blend of polyhydric alcohols incompletely esterified with higher fatty acids and partially esterified with dicarboxylic acids, and sold by the Emulsol Chemical Corporation of Chicago, Illinois, and 15 parts by weight of N-methyl morpholine together with sufficient lithium ricinoleate to give a final product containing 1.5% by weight of this compound (lithium content 0.03% by weight). The prepolymer is fed to the mixing chamber of a prepolymer machine at the rate of 22 grams per minute and the aqueous emulsion is fed to such chamber at the rate of 11 cc. per minute. There is obtained a flexible polyurethane foam.

A sample of this foam is held for five days at a temperature of 180° F. and at 100% relative humidity. After cooling to room temperature, the foam retained its original shape and color, was strong and was somewhat more flexible than a control containing no phosphate ester and no lithium compound. A sample containing the phosphate ester, but no lithium compound was strongly discolored and disintegrated under slight tension after the test.

*Example II*

The procedure of Example I is repeated, employing in place of the lithium ricinoleate 1% by weight of lithium carbonate on the weight of the final product (lithium content 0.18% by weight). After exposure to high humidity at elevated temperature, the foam has a good color is softer and more flexible than the control.

*Example III*

The procedure of Example I is repeated employing in place of the lithium ricinoleate 2% by weight of magnesium oxide, or 1% by weight of Epon 828 which is a liquid epoxy resin sold by the Shell Chemical Corporation, or 2% by weight of Ferro 1212 which is a barium-cadmium stabilizer for vinyl compounds sold by the Ferro Chemical Company, or 2% by weight of Ferro 1212 and 2% by weight of A–5 which is a liquid epoxy resin sold by Union Carbon & Carbide. In each case, after exposure to high humidity at elevated temperature the foam was strongly discolored and crumbled to the touch.

It is to be understood that the foregoing detailed description is merely given by way of illustration and that many variations may be made therein without departing from the spirit of our invention.

Having described our invention, what we desire to secure by Letters Patent is:

1. A polyurethane composition containing at least 3% by weight of a chlorinated phosphate ester in which the chlorine is linked to an aliphatic carbon and a basic lithium containing compound in an amount sufficient to give a lithium content of at least 0.25% by weight said lithium-containing compound acting to stabilize said composition against degradation upon exposure to high humidity at elevated temperatures.

2. A polyurethane composition containing between 5 and 10% by weight of a chlorinated phosphate ester in which the chlorine is linked to an aliphatic carbon and a basic lithium containing compound in an amount sufficient to give a lithium content of between 0.15 and 0.4% by weight said lithium-containing compound acting to stabilize said composition against degradation upon exposure to high humidity at elevated temperatures.

3. A composition according to claim 1 in which said phosphate ester is a lower aliphatic ester.

4. A composition according to calim 1 in which said basic compound is lithium carbonate.

5. In a process for producing flame-retardant polyurethane foams in which a reactant mixture is prepared comprising water, a prepolymer of a polyester containing free hydroxyl groups, an organic diisocyanate, a chlorinated phosphate ester in which the chlorine is linked to an aliphatic carbon and a catalyst for the reaction of said polyester prepolymer with said diisocyanate and in which said reactant mixture is permitted to react to produce said polyurethane foam, the improvement which comprises including in said reactant mixture a sufficient amount of a basic lithium-containing compound so that the foam produced has a lithium content of at least 0.025 percent by weight, said lithium-containing compound acting to stabilize said polyurethane foam against degradation upon exposure to high humidity at elevated temperatures.

References Cited in the file of this patent
UNITED STATES PATENTS

| | | |
|---|---|---|
| 2,634,244 | Simon et al. | Apr. 7, 1953 |
| 2,730,518 | Birley et al. | Jan. 10, 1957 |

OTHER REFERENCES

Ferrari et al.: "Ind. and Eng. Chem.," volume 50, No. 7, July 1958, pages 1041 to 1044.

UNITED STATES PATENT OFFICE
CERTIFICATE OF CORRECTION

Patent No. 3,041,295                   June 26, 1962

George H. Wiech et al.

It is hereby certified that error appears in the above numbered patent requiring correction and that the said Letters Patent should read as corrected below.

Column 4, line 14, for "0.25%" read -- 0.025% --.

Signed and sealed this 1st day of January 1963.

(SEAL)
Attest:

ERNEST W. SWIDER
Attesting Officer

DAVID L. LADD
Commissioner of Patents